United States Patent [19]

Bom

[11] Patent Number: 4,976,086
[45] Date of Patent: Dec. 11, 1990

[54] METHOD AND DEVICE FOR BUILDING A GREENHOUSE

[75] Inventor: Petrus L. J. Bom, Maasland, Netherlands

[73] Assignee: P.L.J. Bom Beheer B.V., Netherlands

[21] Appl. No.: 362,669

[22] Filed: Jun. 7, 1989

[30] Foreign Application Priority Data

Jun. 7, 1988 [NL] Netherlands ............... 8801464
Oct. 11, 1988 [NL] Netherlands ............... 8802497
Jan. 16, 1989 [BE] Belgium ..................... 8900039

[51] Int. Cl.$^5$ .......................................... E04G 21/14
[52] U.S. Cl. ......................................... 52/741; 52/749
[58] Field of Search ............... 52/741, 745, 747, 749; 47/17

[56] References Cited

U.S. PATENT DOCUMENTS 3,354,599  11/1967  Martin ................... 52/741
4,591,308  5/1986   Imai ..................... 52/749 X Primary Examiner—David A. Scherbel
Assistant Examiner—Creighton Smith
Attorney, Agent, or Firm—Watson, Cole, Grindle & Watson

[57] ABSTRACT

During building of a greenhouse the roof is glazed. Glass plates are thereby lifted. This a dangerous job, since the glass plates can break in the process.

In accordance with the invention the glass plates are lifted by means of at least one lift which is suspended from construction elements of the greenhouse.

The glazing crew can arrange the ridge profiles in addition to the glass plates and bars.

6 Claims, 6 Drawing Sheets

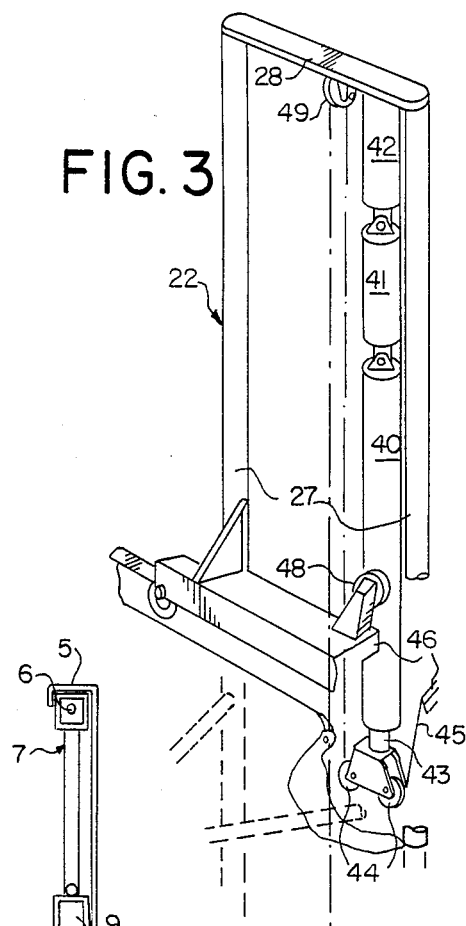
FIG. 3
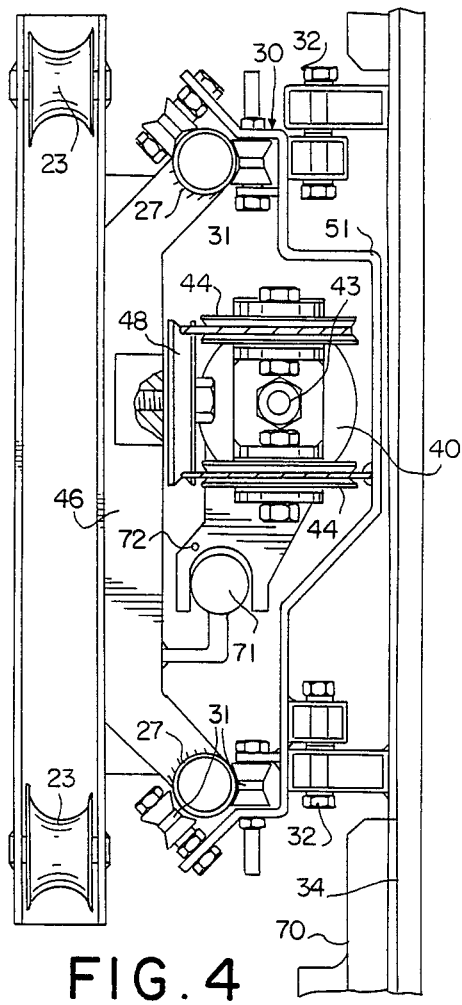
FIG. 4
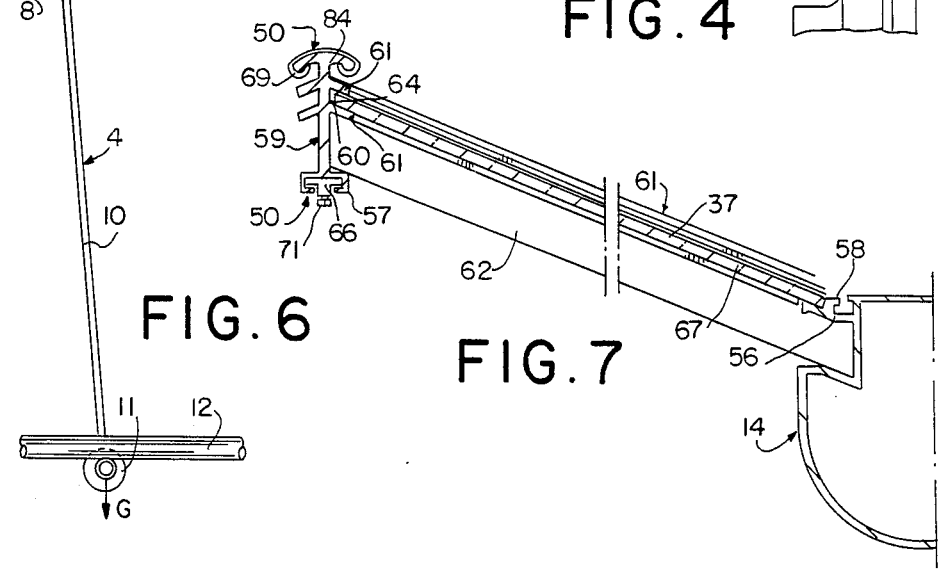
FIG. 6
FIG. 7

METHOD AND DEVICE FOR BUILDING A GREENHOUSE

The invention relates to a method for building a greenhouse whereby a roof portion is glazed.

The raising of glass plates, particularly above the head, is a dangerous and heavy job.

The invention has for its object to simplify and/or make less dangerous the method for building a greenhouse. To this end the characteristic of claim 1 is applied.

The invention also relates to and provides a device for performing the method. The remaining claims denote preferred embodiments of the method and device according to the invention.

In the known method a frame consisting of pillars, trusses, guttering and ridge profiles is first erected by a frame erection crew. The ridge profiles are thereby supported at the location of the trusses by glazing bars.

An improved method for the building of a greenhouse is provided which has the feature that ridge profiles are arranged by a glazing crew of at least one person, which crew also fits the bars and panels, for example glass plates, between the ridge profiles and the guttering.

The glazing crew, which must necessarily already be working at high level for the arranging of the bars and panel, can, taking advantage of its presence there, then also fit the ridge profiles.

The invention will be elucidated in the description following hereinafter with reference to a drawing, in which:

FIG. 3 is the fraction III from FIG. 2 on a larger scale;

FIG. 4 is a bottom view of the device of detail IV from FIG. 2;

FIG. 5 show extension pieces of a guide frame of a lift from FIG. 2;

FIG 6 is a cross section through a roof portion for glazing;

FIG. 7 shows on a larger scale a fraction of a roof of a greenhouse;

Figure 1:
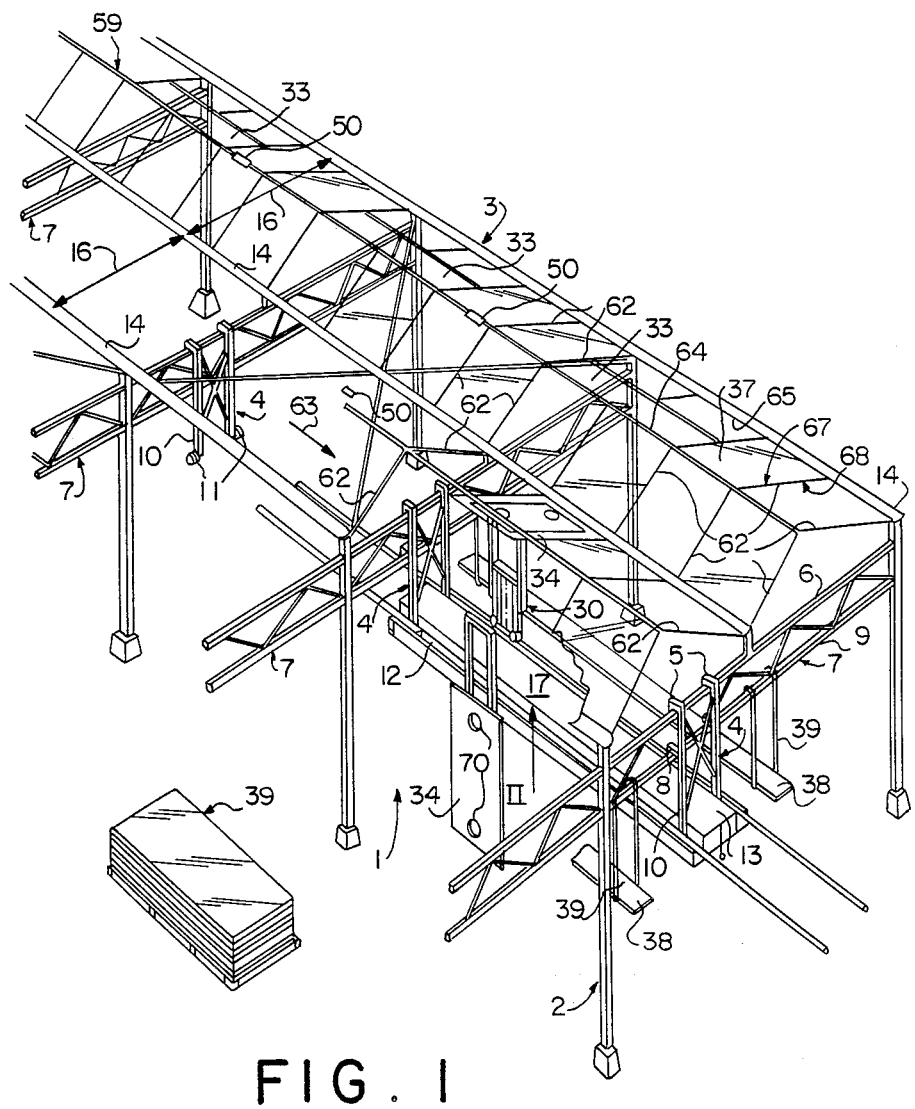
FIG. 1 shows a schematic, perspective view of a greenhouse according to the invention during performance of the method according to the invention.
Figure 2:
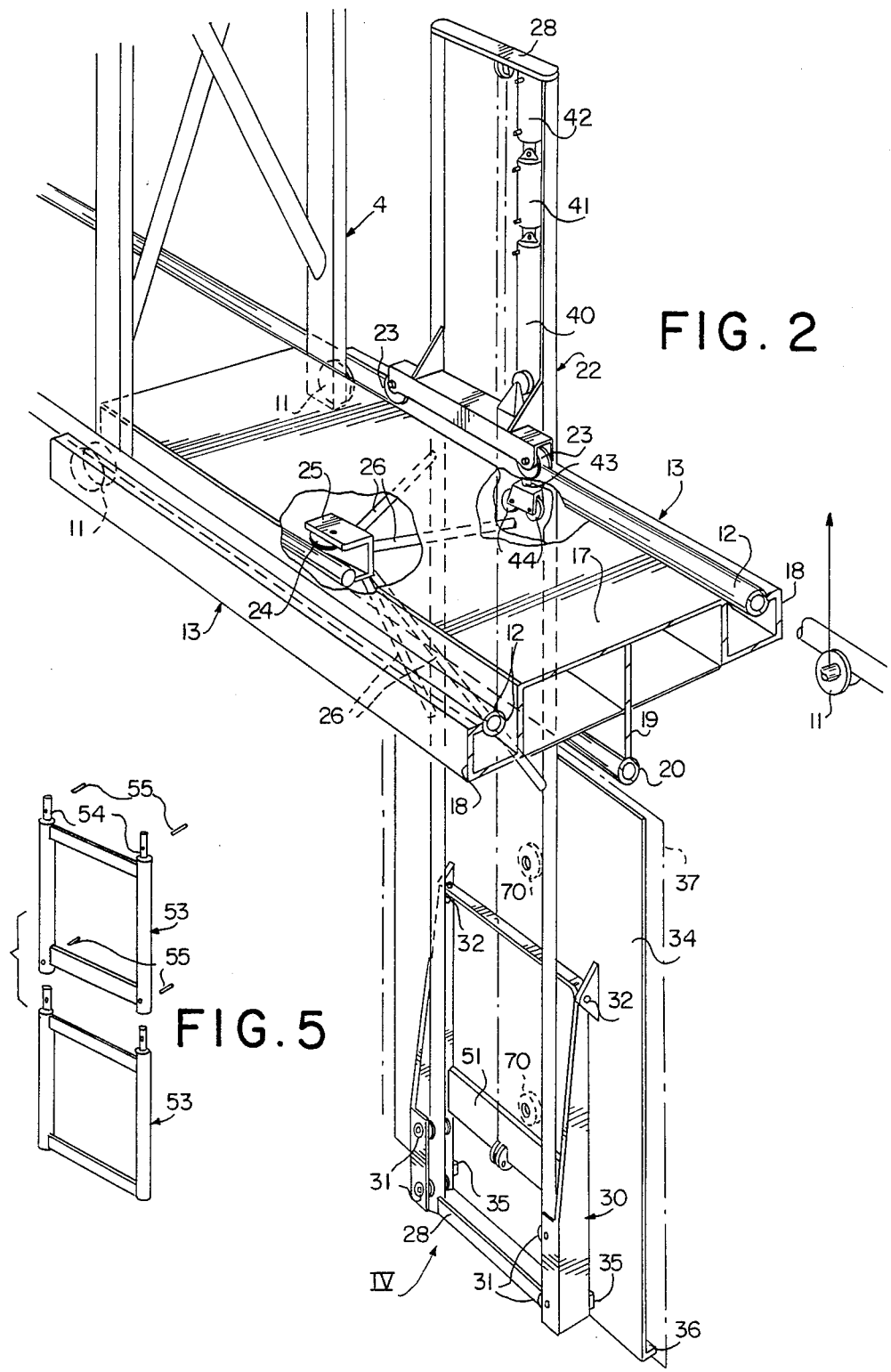
FIG. 2 shows a larger scale the fraction II from FIG. 1.

The device 1 according to the invention for glazing a roof portion 3 of a greenhouse 2 comprises suspension frames 4 which each grip by means of two hooks 5 round the upper profiles 6 of a truss 7 and which grip for clamping under the lower profiles 9 thereof by means of stops 8. Since the hangers 10 of the suspension frame 4 are directed directly downwards from the truss 7 they are held during operation in clamping position on truss 7 by the weight G. The bottom ends of the hangers 10 bear grooved rollers 11 on which round tubular rails 12 of the frame 13 support. These rails 12 protrude on either side of frame 13 and are of a length which ensures that frame 13 always supports on at least two suspension frames 4, irrespective of the position relative to the suspension frames 4.

During glazing of the roof portion 3 of a greenhouse 1 successive head pieces 16 are glazed between two successive gutters 14.

Each time a head piece 16 is glazed three suspension frames 4 are suspended from three successive trusses 7 and the frame 13 is disposed each time at this position between two successive trusses 7 where glazing is being carried out, and the frame 13 can be shifted depending on the progress made, while the rails 12 are rolled over the rollers 11.

The frame 13 consists of a wide box girder 17 having on both sides duct-shaped edges 18 and there is little clearance remaining over which the frame could tilt. The box girder 17 has a downward facing flange 19 with a round tubular lower rail 20.

A substantially vertical guide frame 22 is suspended on frame 13 by means of vertical, grooved rollers 23 which support on the top side of a rail 12 and a horizontal grooved roller 24 which supports against the rail 20 and which is mounted for rotation in a bearing 25 fixed to guide frame 22 by means of shores 26.

The guide frame 22 consists substantially of two vertical, round tubular rails 27 mutually connected by means of cross pieces 28. The guide frame 22 can be rolled manually along the rails 12 and 20.

Arranged along the guide frame 22 at each side is a lift 73, of which a lift element 30 is vertically guided. For this purpose four grooved rollers 31 are mounted for rotation on the lift element 30 and grip onto the rails 27. By means of horizontal hinge joints 32 the lift element 30 carries a glass plate carrier 34 which is held slightly inclined relative to the vertical plane by way of spacer elements 35 and which has a bearing edge 36 preferably covered with rubber for supporting of a glass plate 37.

A guide frame 22 with lift element 30 and glass plate carrier 34 is preferably present on both sides of frame 13, in addition to a scaffold board 38 resting on two auxiliary hangers 39 which are also suspended from successive trusses 7.

In preference one person stands on each of both scaffold boards 38 and one person on the box girder 17. A fourth person stands on the ground to place glass plates 37 from a supply stack 47 onto the glass plate carrier 34.

The lift element 30 is raised by means of at least one pneumatic cylinder 40 which is preferably connected in series to two short cylinders 41 and 42. These cylinders support against the top cross piece 28 and the piston rod 43 of cylinder 40 carries on its lower end two cable reels 44 (FIG. 3). A cable 45 is fixed in place to a beam 46 of guide frame 22 and is threaded successively over a roller 44, a roller 48 mounted rotatably on the beam 46, a roller 44 and a roller 49 mounted rotatably on the top cross piece 28, and is finally fastened to a cross piece 51 of the lift element 30. A considerable lifting height of the lift element 30 is thus realized with a comparatively small outward stroke of the cylinder 40–42.

The large cylinder 40 is for bridging the height of a greenhouse with a structure height of 300 cm and the cylinder 40 is set into operation in the case of a structure height of 350 cm and the cylinders 42 and 41 are together set into operation in the case of the largest structure height of for instance 400 cm. In the case of greater structure heights one or two extension pieces 53 as in FIG. 5 are built on at the bottom of the guide frame 22 by means of protrusions inserted into the rails 27 and transverse locking pins 55. An air unit (not shown) is connected via hoses and actuating means to the cylinders 40–42.

When the lift element 30 has arrived with glass plate carriers 34 and glass plate 37 at the top of guide frame 22 the glass plate carrier 34 is tilted about the hinge joints 32 into an inclined plane corresponding substantially with the roof slope (see FIG. 7). The glass plate 37 is then first placed by the person standing on the box girder 17 above the supporting flange 56 of the gutter 14, and is subsequently pushed with an upper edge 64 into a hollow 60 between two flanges 61 of a ridge profile 59 of the greenhouse 2, after which it is pushed back with its lower edge 65 onto the supporting flange 56 against a stop edge 58.

The glass plate 37 is then pushed in arrow direction 63 until a side edge 67 thereof comes to rest in a recess of a bar 62, which has been pushed beforehand in arrow direction 63 against the fourth edge 68 of the preceding glass plate 37.

Finally, this glass plate 37 is enclosed with a subsequent bar 62.

It should be noted that instead of a supporting edge 36 two suction cups 70 are preferably arranged on the glass plate carrier 34. In this case all the edges of the glass plate 37 are free and the glass plate can be maneuvered while still remaining continuously fixed to the glass plate carrier 34. Only when the glass plate 37 lies in the required position are the suction cups 70 released.

In the view of FIG. 4 can be seen how the rollers 31 can grip on the rails 27 and how the glass plate carrier 34 can be attached pivotally on hinge joints 32.

In addition the guide frame 22 preferably has another rail 71 onto which engages a fork 72 fixed to the piston rod 43 in order to prevent rotation of piston rod 43.

It should be remarked that the diverse components, that is, the two lifts 73, the three suspension frames 4 and the frame 13 of the device 1 are manufactured in preference from aluminum so that they are of light weight and thus easily manageable. The term "glass plate" should be read as any transparent panel of glass or plastic having one or multiple layers, and which may or may not be held in a frame.

The frame 13 would optionally be suspended from two successive gutters 14 of the greenhouse 2, in which case glazing is performed in the direction transversely of the gutters 14.

Figure 8:
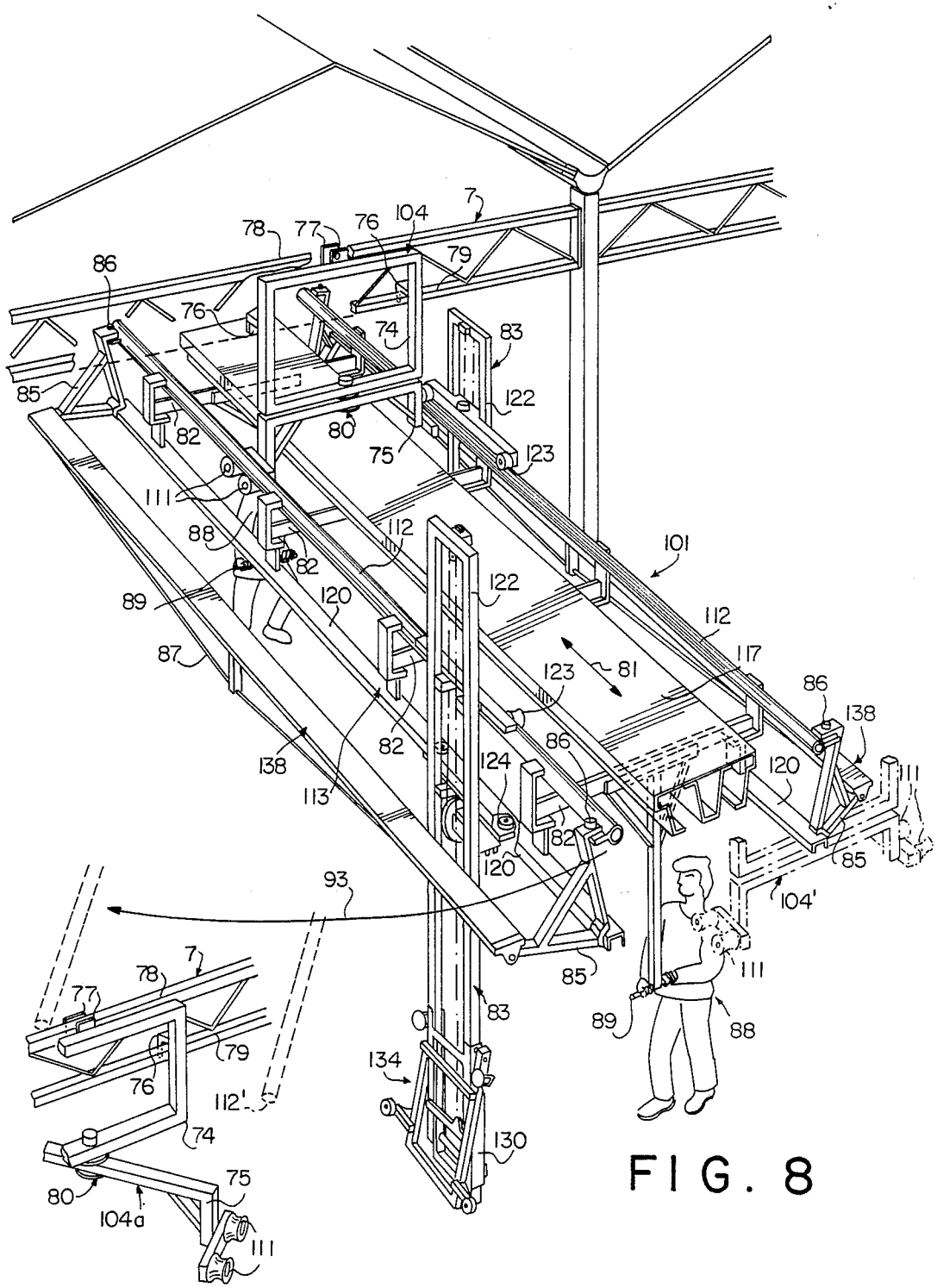
FIG. 8 is a schematic, perspective view of a greenhouse according to the invention during performance of a preferred embodiment of the method according to the invention.
Figure 9:
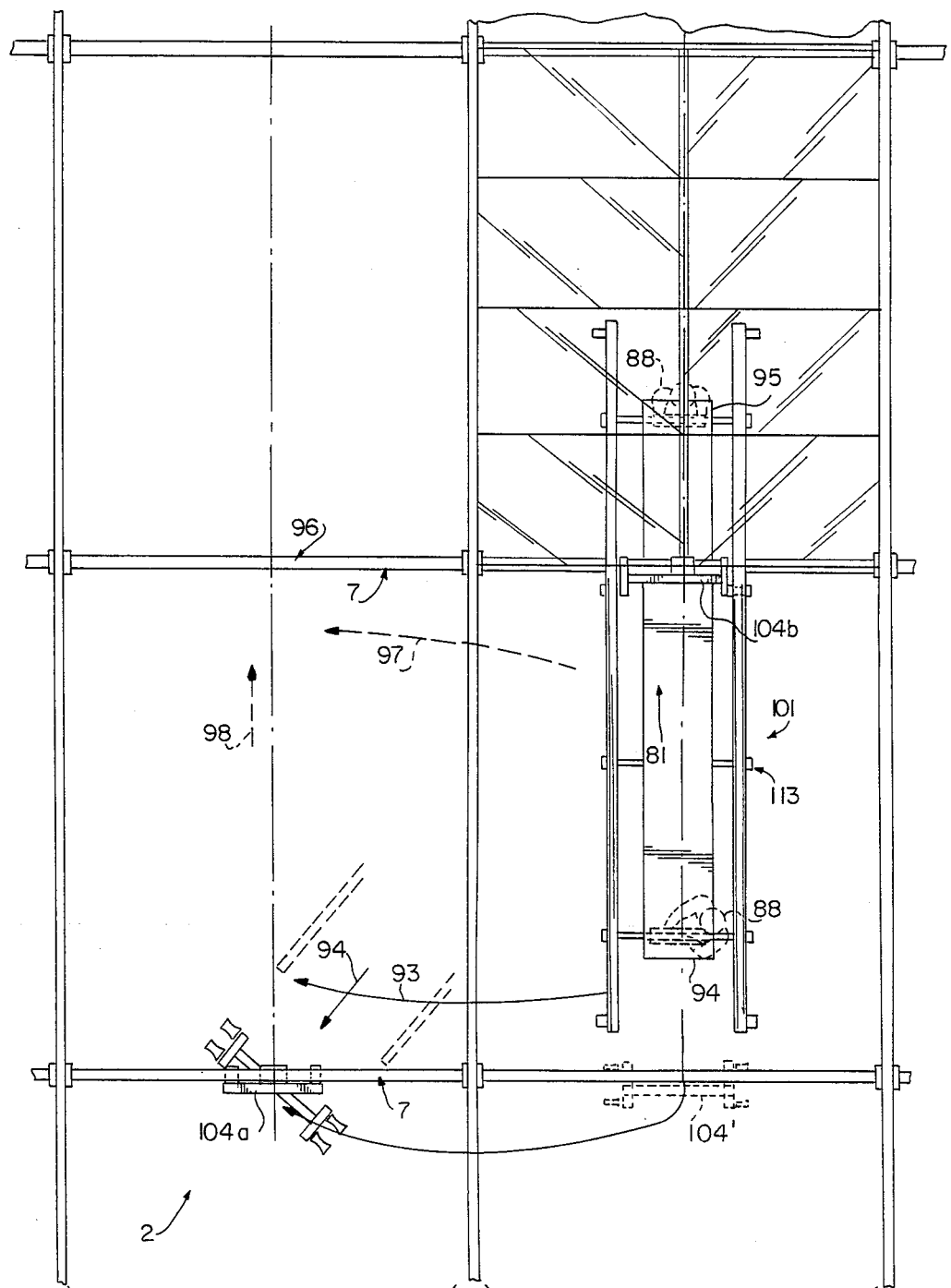
FIG. 9 shows a schematic top view of FIG. 8.
Figure 10:
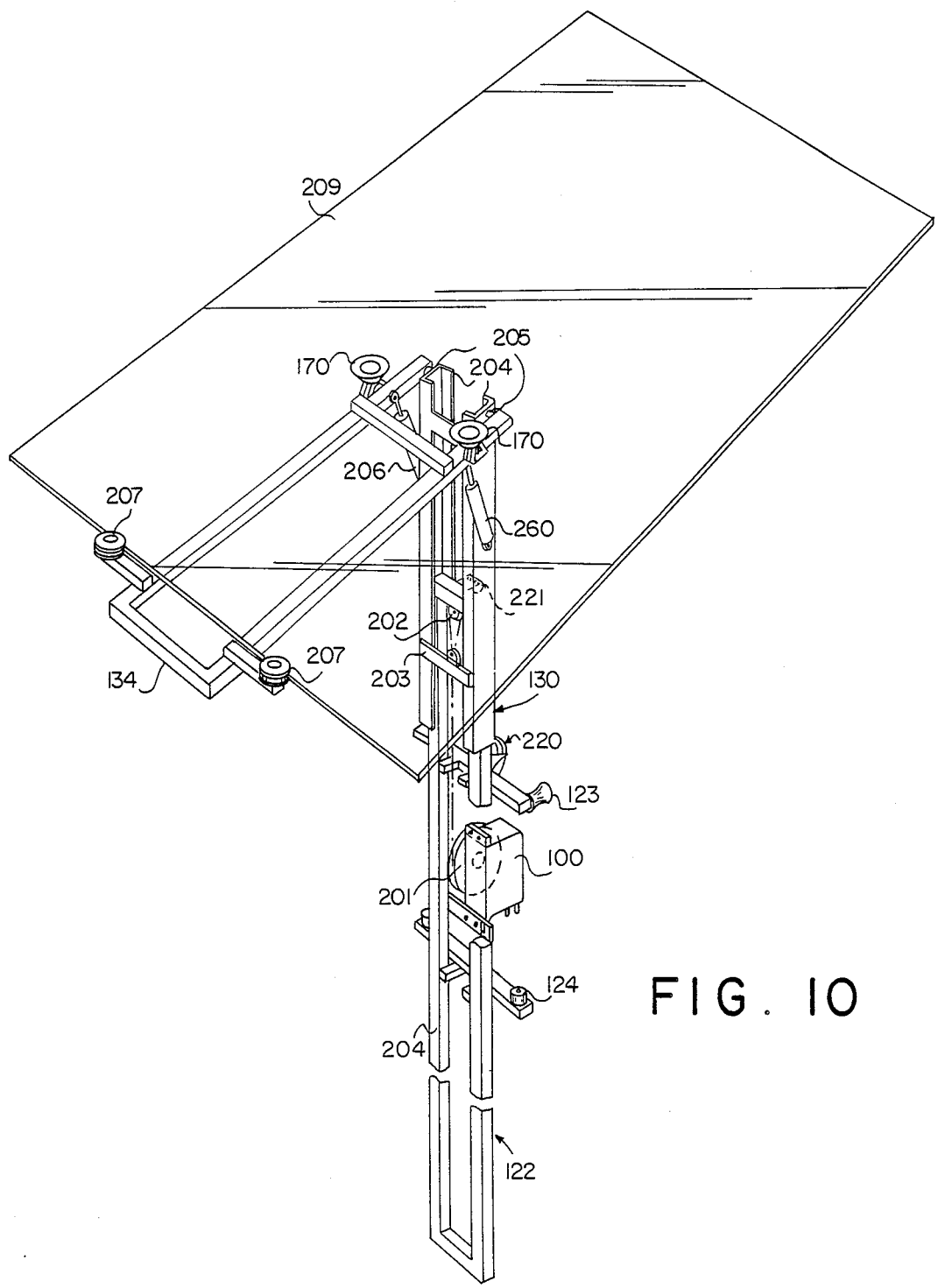
FIG. 10 shows on a larger scale detail X from FIG. 8 in a different position.

The device 101 from FIG. 8–10 corresponds substantially with the device 1, although the device 101 and the method to be performed therewith are to be preferred. Corresponding components are provided in FIG. 8–10 with the same reference numerals, with 100 added thereto however.

The suspension frames 104 of the device 101 consist of a bottom piece 75 and a top piece 74 which grips with a U-shaped gripper element 77 beneath an upper profile 78 and which grips from above with two hooks 76 over a lower profiled 79. In this manner an easily detachable but also firm gripping is realized on the truss 7.

The bottom piece 75 is fastened to the top piece 74 for swiveling about a central, vertical hinge pin 80 and is furnished with rollers 111 for supporting and allowing displacement in lengthwise direction 81 of a frame 113, of which tubular rails 112 co-act with the rollers 111. Frame 113 further comprises four cross beams 82 to which is fixed a thin-walled profile in addition to U-profiles 120.

Two lifts 83 are once again carried on either side of frame 113. To this end, a vertical guide frame 122 rolls each time by way of rollers 123 along rails 112 while rollers 124 grip at a lower level into the U-shaped profiles 120.

Scaffold boards 138 are attached by means of spaces frames 85, which are arranged between the ends of scaffold boards 138 and rails 112, such that a lift 83 can move between them. Frames 85 are attached to rails 112 with quick connection couplings 86, for example bayonet closures. The scaffold boards 138 are further biased with a cable 87 so as to be able with their own small weight to bridge a considerable span while loaded with personnel. Two cross beams 82 located at the ends bear a robust, downward facing grip member 89 at hip level of a person 88. The frame 113 can be moved herewith in lengthwise direction of the suspension frames 104. In the case that a first roof portion 91 of the greenhouse 2 has been glazed the device 101 is moved as follows underneath an adjacently situated second roof portion 92 that still has to be glazed.

The scaffold boards 138 are removed from the frame 113. The frame 113 is displaced in the lengthwise direction 81 by two persons 88 until it is released from a first suspension frame 104a, which is then moved by a third person from a truss 7 located beneath the first roof portion 91 to a truss 7 located beneath the second roof portion 92.

Any locking there may be between top piece 74 and bottom piece 75 is subsequently released and the frame 113 is swiveled together with the bottom piece 75 about the hinge pin 80 as according to arrow 93 such that the other end 94 of frame 113 comes to lie beneath the second roof portion 92, where it is hung from the swiveled suspension frame 104a after a lengthwise displacement as according to arrow 99. This lengthwise displacement is continued until the frame 113 is released from the frame 104b. This is now suspended at the position 96 from the truss 7 located under roof portion 92.

The one end 95 is then swung about the other end 94 as according to arrow 97, such that the one end 95 also comes to lie under the second roof portion 92. Finally, after a displacement in the direction of arrow 98 the frame 113 is suspended from the suspension frame 104b. The whole length of roof portion 92 can now be worked on using permanently attached scaffold boards 138.

The frame 113 is moved stepwise in one direction, for instance 98, whereby the freed suspension frame 104 is hooked on two trusses further up each time.

The displacing of frame 113 can easily be performed by two persons as a result of its light construction and its manufacture from profile material and from aluminum, while a third person moves the suspension frame 104.

Each lift 83 comprises a vertical guide frame 122 to which is fixed a variable speed electromotor 100 which drives a winch pulley 201. The winch cable thereof runs over a return pulley 202 hung at the top of guide frame 122 to a cross beam 203 of a lift element 130 which is guided around guide frame 122 in U-rails 204 by means of slide blocks. A glass plate carrier 134 is pivotable relative to the lift element on horizontal shafts 205 and is pulled to its vertical position by means of gas springs 206. The glass plate carrier 134 has grooved rollers 207 and suction cups 170 for carrying a glass plate 209. In the lowered and vertical position of FIG. 8 a glass plate 209 is placed by the third person on the carrier 134 and sucked into position with suction cups 170. The lift element 130 is then raised with the glass plate 209 by actuation of a band switch 221 to a position above roof level, the carrier 200 is tilted relative to lift element 130 into the position drawn in FIG. 10, the suction cups 170 are rendered inoperative, the glass plate 209 is taken off the carrier 134 and laid on the roof while a bar is inserted.

The gas springs 206 then draw the carrier 134 back towards the lift element 130. Using a foot switch 220 the motor 100 is energized for downward movement of lift element 130. The motor can be adjusted such that it causes lift element 130 to travel a determined path each time.

The glazing crew consisting of at least one person, but preferably of a plurality of persons, preferably also arranges the ridge profiles 59. For this purpose the first ridge profile 59 is supported at both ends by two bars 62 in each case, following which glass plates 37 and bars 62 are further arranged alternately by the same glazing crew between gutters 14 and ridge profiles 59. The following ridge profiles are joined with coupling means 50 to a preceding ridge profile 59 in each case and supported with respect to two gutters 14 by means of at least a pair of bars, after which the same glazing crew again fits glass plates 37 and bars 62 thereto. The glazing crew thereby preferably remains the whole time at high level, making use of the device 1 displaced in lengthwise direction of gutters 14. While the device is being moved the glazing crew of a part of it can sit on a truss 7.

The coupling means 50 are preferably disposed at locations where a swivel roof window 33 is not situated. The coupling means 50 consist of a C-shaped profile piece 69, which is pushed around the head ends 84 of two ridge profiles 59 striking against one another, and of a strip 66 which is pushed into C-shaped bottom pieces 57 of these ridge profiles 59 and clamped into position thereto by means of bolts 71

In a greenhouse preferably one roof portion at a time is assembled. While the required ridge profiles, bars and panels are already being arranged in the length of a roof portion between two successive trusses, the rest of the roof portion between two successive trusses, the rest of the roof portion is still virtually without ridge profiles. Up to the point reached by the glazing crew however the roof portion is almost entirely completed. Next to the roof portion where work is going on there is a number of roof portions still without ridge profiles. It is characteristic of this preferred method that the glazing crew assembles a roof portion of a greenhouse in a continuous operation, whereby this crew also arranges the ridge profiles at the same time as they are at a high level for the glazing activity. Use is preferably made thereby of the device 1.

I claim:

1. Method for building a greenhouse, whereby a roof portion is glazed, said method comprising the following steps:
   (a) suspending at least one frame from construction elements of said greenhouse;
   (b) supporting lifting means by means of said frame;
   (c) supporting at least one glass plate carrier by means of said lifting means at a low level;
   (d) placing at least one glass plate on said glass plate carrier at the low level;
   (e) raising said glass plate together with said glass plate carrier to a higher level by means of said lifting means;
   (f) removing the glass plate from the glass plate carrier at the higher level and installing the glass plate at a predetermined position in the roof portion;
   (g) returning the glass plate carrier to a low level; and
   (i) repeating steps (d)–(g) for installing the glass plates in successive predetermined positions in the roof portion, whereby the lifting means is advanced along said successive predetermined positions.

2. Method as claimed in claim 1 wherein the lift is suspended from trusses of the greenhouse.

3. Method as claimed in claim 1 wherein the lift is supported by means of a frame which is displaceable in horizontal direction relative to suspension means suspended from construction elements of the greenhouse.

4. Method as claimed in claim 1 wherein the glass plates are raised by means of a glass plate carrier which is tiltable with respect to at least one raisable lift element.

5. The method according to claim 1, wherein the frame and lifting means are advanced along rails suspended from construction elements of said greenhouse.

6. Method for building a greenhouse whereby a roof portion is glazed, comprising the steps of raising the glass plates by means of at least one lift suspended from a frame that is suspended by means of suspension means from at least two trusses of the greenhouse, whereby the frame is carried from beneath a first roof portion to beneath an adjacent second roof portion by:
   swiveling the frame about its one end with which it is suspended by means of suspension means from a truss located beneath the first roof portion, such that the other end comes to lie under the second roof portion;
   suspending this other end of the frame by means of suspension means from a truss situated beneath the second roof portion;
   subsequently swiveling the frame about the suspended other end such that the one end likewise comes to lie beneath the second roof portion;
   and by then also suspending the one end by means of suspension means from a truss situated beneath the second roof portion.

* * * * *